Aug. 17, 1965  J. D. COTA  3,200,945
BEAN SEPARATOR
Filed Oct. 22, 1962
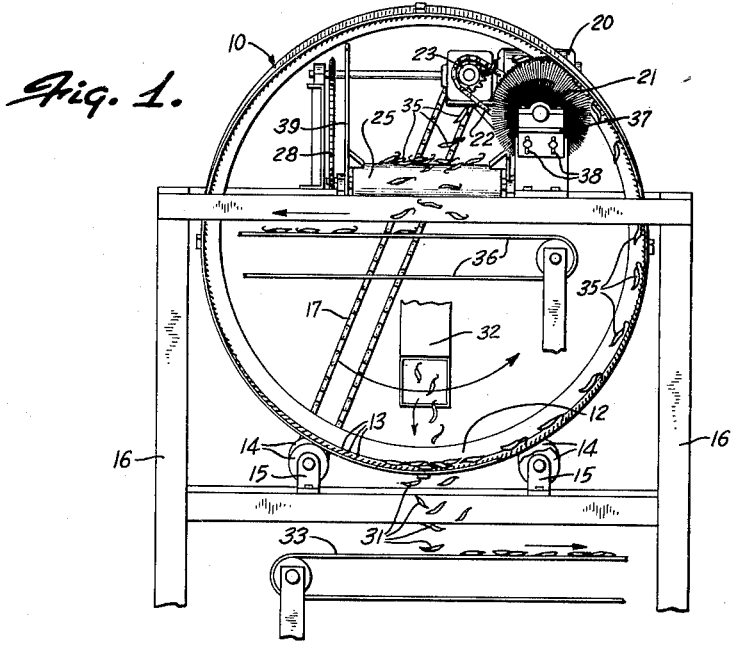
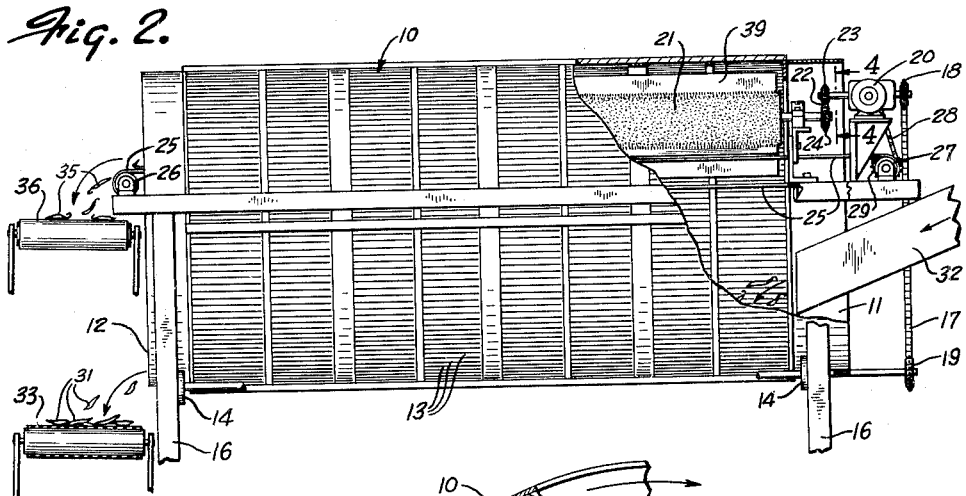
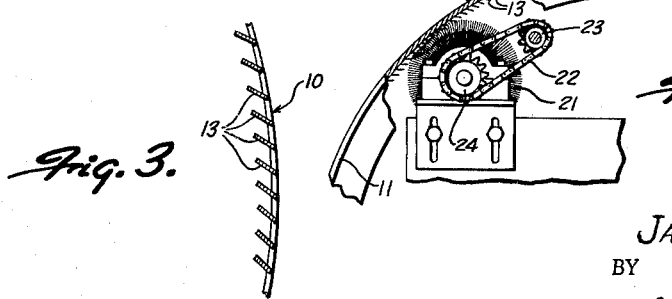
INVENTOR.
JAMES D. COTA
BY
*Lieber & Nilles*
ATTORNEYS

United States Patent Office 3,200,945
Patented Aug. 17, 1965

3,200,945
BEAN SEPARATOR
James D. Cota, 324 Orchard St., Gillet, Wis.
Filed Oct. 22, 1962, Ser. No. 232,000
4 Claims. (Cl. 209—78)

The present invention relates generally to improvements in the art of separating unsnipped beans and extraneous matter from beans which have been properly snipped preparatory to canning or packaging, and relates more particularly to the provision of improved apparatus for automatically effecting the separation.

A primary object of the invention is to provide an improved bean separator or classifier which is extremely simple in construction and which is moreover highly efficient and completely automatic in operation.

In harvesting and preparing snap beans or the like for packaging, the beans are first stripped from the bushes, the stalks and beans are thereafter separated, the beans are then snipped, and the snipped beans are finally graded. The stripping operation is customarily performed by a machine operation, and various mechanized contrivances have been proposed for such purposes. Likewise, various devices have been heretofore proposed for separating the stalks or portions of the vines from the beans prior to the bean snipping operation, and one such separating machine, as shown and described in United States Patent No. 1,743,240, dated Jan. 14, 1930, comprises generally a rotatable drum inclined slightly from its inlet end to its discharge end to deliver the beans therethrough, the drum having staggered rows of spaced pins projecting inwardly to act as hooks for catching the branches of the stalks or vines and carrying them upwardly to an endless conveyor for separate discharge. Machinery for snipping and cutting the beans has also been designed as shown in United States Patent No. 2,293,141, dated Aug. 18, 1942, wherein means have been provided for elevating the beans and thereafter assembling the same and dispersing them in end to end relation on a conveyor for delivery to the cutting zone for the cutting and snipping operation. The cut beans may then be finally graded as by means of a device such as disclosed, for example, in United States Patent No. 2,313,375, dated Mar. 9, 1943, in which an inclined revolving conveyor drum is formed with recesses of different sizes in its inner wall for receiving the cut beans and carrying them to an elevated hopper and discharge conveyor.

However, despite all of these attempts to mechanize the harvesting and subsequent handling of beans, no known satisfactory and practical apparatus has heretofore been available for effectively separating beans which have inadvertently been left unsnipped as well as other extraneous matter from the properly snipped beans, and such separation or segregation is generally a hand operation requiring the services of several persons.

It is accordingly an important object of this invention to provide an improved automatically operable separating machine which effectively eliminates this hand operation and thereby fills a void heretofore present in the bean harvesting and handling industry.

Another object of the present invention is to provide an improved apparatus for separating unsnipped beans and extraneous matter from snipped beans which comprises, an open-ended drum inclined longitudinally to provide an inlet at its high end and an outlet at its low end, the drum wall being formed of circumferentially spaced inwardly directed fins, means for rotating the drum to cause the snipped beans to gravitate along the bottom thereof from the inlet end to the outlet end while the unsnipped beans and extraneous matter is carried upwardly by the fins, and means for removing the unsnipped beans and extraneous matter in a zone segregated from the path of travel of the snipped beans.

These and other objects and advantages of the invention will become apparent from the following detailed description.

A clear conception of the improvements constituting the present invention and of the construction and operation of a typical bean separator embodying the invention may be had by referring to the drawing accompanying and forming a part of this specification wherein like reference characters designate the same or similar parts in the several views.

FIG. 1 is a fragmentary end view of a typical bean separator embodying the invention taken from the discharge end of the device;

FIG. 2 is a fragmentary side elevational view of the device, parts being broken away to reveal normally concealed structure;

FIG. 3 is an enlarged transverse section through a fragment of the drum wall to show the fin construction thereof; and FIG. 4 is a fragmentary section taken along the line 4—4 of FIG. 2 to show the drive for the rotary brush which removes the unsnipped beans and extraneous matter from the drum wall.

While the invention has been shown and described herein as being especially adapted for the separation and segregation of unsnipped beans and snipped beans and as embodying a particular type of drive mechanism for the various parts of the apparatus, it is not desired or intended to thereby unnecessarily limit the improvements by reason of such restricted embodiments; and it is further contemplated that certain specific descriptive terms used herein shall be given the broadest possible interpretation consistent with the disclosure.

Referring to the drawing, the typical apparatus shown therein as embodying the invention comprises, in general, a cylindrical drum 10 having the opposite ends 11, 12 thereof open and the cylindrical wall of which is formed of a circumferentially spaced series of inwardly directed fins 13; means such as a plurality of rollers 14 journalled for rotation in bearing blocks 15 or the like carried by a frame 16 for rotatably supporting the drum 10 at an incline to the horizontal, one or more of the rollers 14 being driven as through a drive chain 17 and sprockets 18, 19 by a suitable motor or engine 20 to thereby rotate the drum 10; means in the form of a rotatable brush 21 or the like carried on the frame 16 and coacting with the interior of the drum wall for brushing the same, the brush 21 being driven simultaneously with and in the same direction as the drum 10 but at a faster peripheral speed as through a chain and sprocket connection 22, 23, 24 with the motor 20; and means such as an endless conveyor 25 longitudinally traversing the drum interior below the brush 21 for receiving debris removed by the brush and conveying the same exteriorly, the conveyor supporting rollers 26, 27 likewise being mounted for rotation on the frame 16 with the roller 27 being driven through a chain and sprocket connection 28, 29 with the motor 20.

As indicated, the drum 10 is rotatably supported with its axis longitudinally inclined, and the high end 11 serves as the inlet end while the low end 12 serves as the discharge end. Thus, snipped beans 31 introduced as by way of a hopper or delivery chute 32 into the open end 11 of the drum 10 gravitate along the bottom of the drum to the outlet end 12 since the snipped beans have no protrusions to be caught by and between the inwardly directed fins 13; and from the outlet end 12 of the drum 10, the snipped beans 31 fall onto an endless conveyor 33 or the like which carries them away to a point of disposal such as the packaging or processing station (not shown).

However, as the drum 10 is rotated, the unsnipped beans 35 and extraneous matter having protrusions are caught by and between the fins 13 of the drum wall and are elevated in an arch with the drum as it is rotated as illustrated in FIG. 1; and as the unsnipped beans 35 and extraneous matter reach the brush 21, they are dislodged from the finned wall of the drum 10 and are thrown onto the conveyor 25 by reason of the fact that the brush 21 is driven at a faster peripheral speed than the drum through the differential sprockets 23, 24. The conveyor 25 then discharges the unsnipped beans 35 through the open end 12 of the drum and onto another suitably driven endless conveyor 36 which deposits them at another station for disposal. The brush 21 is preferably rendered adjustable relative to the drum wall as by forming the end bearing blocks or journals 37 with elongated slots 38 for receiving the attachment bolts, and an upright stop plate or wall 39 is preferably provided along one side of the conveyor 25 for positively directing the unsnipped beans and debris onto the conveyor.

From the foregoing detailed description, it is apparent that the present invention contemplates the use of a fin type screen either mounted in or forming the wall of a longitudinally inclined rotary drum 10 and adapted to catch or hook onto protrusions such as the unsnipped ends of beans and other extraneous matter to separate them from beans which are already properly snipped and ready for further processing. The circumferential drum wall or screen is generally built up of arcuate sections having rows of inwardly extending fins disposed longitudinally of the drum and directed inwardly thereof, the fins being inclined somewhat in the direction of rotation of the drum with the angle of inclination and the spacing between the fins being varied dependent upon the size of the beans being processed by the machine. The unsnipped beans and extraneous matter thus become lodged and are caught in the fins forming the inner wall of the rotary drum and are elevated with the rotating drum to a point approximately two-thirds of the total drum height where they are then brushed off onto a conveyor through the action of the rotary brush 21 driven at a somewhat faster peripheral speed than the drum 10. The snipped beans having no protrusions follow the tilt of the rotary drum and gravitate from the inlet end 11 to the discharge end 12 where they are deposited upon a conveyor for subsequent processing. The improved device is highly efficient in operation and may, of course, be built in various sizes to suit the circumstances. The finned sections from which the drum 10 is fabricated may be readily stamped from sheet material, and the frame 16 may be fabricated of angle iron or the like.

Various modes of carrying out the invention are contemplated as being within the scope of the following claims particularly pointing out and distinctly claiming the subject matter which is regarded as the invention.

I claim:
1. An apparatus for separating snipped beans from unsnipped beans comprising, in combination:
    (a) an open ended cylinder, said cylinder having an inclined axis of rotation with an inlet for snipped and unsnipped beans at its upper end and an outlet for properly snipped beans at its lower end;
    (b) a multiplicity of fixed fins in said cylinder wall,
        (1) said fixed fins extending parallel to each other, being evenly spaced, extending longitudinally of said cylinder and defining slots between said fins substantially equal in width to the spacing of the fins, separated substantially only by the thickness of the fins, and being narrower than the diameter of the beans being separated,
        (2) the margins of the material when the fins are formed defining edges presented to the material being separated;
    (c) means for rotating said cylinder to enable the protrusions on the unsnipped beans to catch on the said edges, and be carried towards the upper portion of said cylinder while properly snipped beans without protrusions gravitate along the lower inclined surface of said cylinder towards said outlet;
    (d) means, supported independently of said cylinder in the upper half thereof, for engaging unsnipped beans hanging from, and being at least partially supported by said edges to dislodge them from said edges; and
    (e) means for catching said dislodged unsnipped beans and discharging them from said cylinder separately from the properly snipped beans.

2. Apparatus for separating unsnipped beans from snipped beans according to claim 1, wherein the longitudinally extending fins formed in the cylinder wall are inclined in the direction of rotation of said cylinder.

3. Apparatus for separating unsnipped beans from snipped beans according to claim 1, wherein the means for catching the unsnipped beans and for discharging the same from the cylinder is a conveyor longitudinally traversing the interior of said cylinder and means are also provided for retaining the unsnipped beans on the conveyor as it traverses the drum interior.

4. Apparatus for separating snipped beans from unsnipped beans in accordance with claim 1, in which the means supported independently of said cylinder is a brush rotating in the same direction as the cylinder and at a faster rate of speed to deposit the unsnipped beans into the catching and discharging means.

References Cited by the Examiner

UNITED STATES PATENTS

| | | | |
|---|---|---|---|
| 493,065 | 3/93 | Campbell | 209—95 |
| 1,196,975 | 9/16 | Pease | 209—86 |
| 1,743,240 | 1/30 | Ryder | 209—78 |
| 1,808,806 | 6/31 | Cooper | 209—95 |
| 1,931,074 | 10/33 | Johnson | 209—95 |
| 2,462,682 | 2/49 | Schubert | 209—78 X |
| 2,869,723 | 1/59 | Autio | 209—86 |

FOREIGN PATENTS 98,285   6/61   Netherlands.

ROBERT B. REEVES, *Primary Examiner.*